United States Patent [19]

Young et al.

[11] Patent Number: 5,679,924
[45] Date of Patent: Oct. 21, 1997

[54] NON-METALLIC FLOOR BOX

[75] Inventors: Joe A. Young, Reedsville; Charles Domigan, Coolville, both of Ohio; John Stauffer, Parkersburg, W. Va.

[73] Assignee: Walker Systems, Inc., Williamstown, W. Va.

[21] Appl. No.: 555,754

[22] Filed: Nov. 9, 1995

Related U.S. Application Data

[63] Continuation of Ser. No. 472,997, Jun. 7, 1995, abandoned.

[51] Int. Cl.$^6$ .................................................. H02G 3/08
[52] U.S. Cl. .................................................. 174/50; 220/3.4
[58] Field of Search .................................. 174/50, 52.1, 57, 174/64, 48, 49; 52/220.1, 220.2, 220.8; 220/3.4, 3.6, 3.7, 3.8, 3.9; 285/4, 64, 93, 423, 901

[56] References Cited

U.S. PATENT DOCUMENTS

| | | | |
|---|---|---|---|
| 1,961,728 | 6/1934 | Arnest et al. | 174/57 X |
| 2,378,861 | 6/1945 | Peevey | 220/3.7 |
| 2,959,633 | 11/1960 | Palmer et al. | 174/50 |
| 2,989,206 | 6/1961 | McAfee | 220/3.7 |
| 3,343,704 | 9/1967 | Terry | 220/3.4 |
| 3,651,245 | 3/1972 | Moll | 174/57 X |
| 4,126,369 | 11/1978 | Rapata et al. | 174/52.1 X |
| 4,331,832 | 5/1982 | Curtis et al. | 174/57 |
| 4,428,492 | 1/1984 | Jorgensen | 174/58 X |
| 4,593,507 | 6/1986 | Hartman | 174/48 X |
| 4,623,170 | 11/1986 | Cornwall | 285/93 X |
| 4,728,750 | 3/1988 | Teslovich | 174/48 |
| 4,967,990 | 11/1990 | Rinderer | 220/3.9 X |
| 5,034,567 | 7/1991 | Mohr | 174/48 |
| 5,086,194 | 2/1992 | Bruinsma | 174/48 |
| 5,125,199 | 6/1992 | Whitney et al. | 174/48 X |
| 5,160,808 | 11/1992 | Hadfield | 174/48 |
| 5,162,612 | 11/1992 | Naka et al. | 174/48 |
| 5,257,487 | 11/1993 | Bantz et al. | 52/220.1 |
| 5,276,279 | 1/1994 | Brownlie et al. | 174/50 X |
| 5,285,009 | 2/1994 | Bowman et al. | 174/48 |
| 5,304,736 | 4/1994 | Halfacre | 174/48 |
| 5,326,060 | 7/1994 | Chubb et al. | 248/231.8 |
| 5,350,884 | 9/1994 | Littrell | 174/48 |
| 5,360,130 | 11/1994 | Lehmann et al. | 220/3.8 |
| 5,362,922 | 11/1994 | Whitehead | 174/48 |
| 5,466,886 | 11/1995 | Lengyel et al. | 174/48 |
| 5,477,649 | 12/1995 | Bessert | 52/220.1 X |

OTHER PUBLICATIONS

Installation Instructions for Steel City, 640P Series Floor Box; (1 page) dated Jan. 1995.
Installation Instructions for Carlon non-metallic floor box (1 page); dated Feb., 1988.
Installation Instructions for Hubbell Plastic Floor Box and Accessories (2 pages); dated May 1990.
Brochure for Carlon Multi-Service Floor Box, copyright 1992.
Brochure for Hubbell Plastic Floor Box, copyright Jul. 1991.

*Primary Examiner*—Kristine L. Kincaid
*Assistant Examiner*—Dean A. Reichard
*Attorney, Agent, or Firm*—McAndrews, Held & Malloy, Ltd.

[57] ABSTRACT

A non-metallic floor box for use in electrical in-floor power and communication distribution systems for office buildings and the like is disclosed. One embodiment of the floor box includes a closed housing having a base, a top and vertically extending side walls defining an interior volume. The disclosed floor box prevents concrete from entering the housing during pouring and setting of the concrete floor, and is adapted to be cut off substantially flush with and parallel to the concrete floor in which it is set. The floor box housing includes gradient markings disposed on at least one of its side walls to indicate the interior volume of the housing and/or the depth of the concrete floor.

8 Claims, 6 Drawing Sheets

NON-METALLIC FLOOR BOX

CROSS-REFERENCE TO RELATED APPLICATIONS

This is a continuation of application Ser. No. 08/472,997 filed Jun. 7, 1995 now abandoned.

FIELD OF THE INVENTION

The invention relates in general to electrical in-floor power and communications distribution systems for office buildings and the like, and in particular relates to a non-metallic floor box accommodating varying floor material depths.

BACKGROUND OF THE INVENTION

In the past, floor box designs for such applications were often fixed-height housings with an open top for receiving a cover assembly. More recently, floor boxes capable of being sawed off to accommodate the depth of the floor in which they were set were developed. Like their predecessors, however, these floor boxes also had an open top for receiving a cover assembly to protect the interior of the box from debris and materials during the concrete pour and before activation.

In addition, local building codes dictate the amount and type of electrical wiring and connections a floor box may contain as a function of its interior volume. In a sawed-off floor box which necessarily has a variable interior volume, this volume had to be determined prior to wiring and activation in order to meet building code requirements.

SUMMARY OF THE INVENTION

Accordingly, one object of the invention is to provide a floor box structure which greatly increases the versatility of floor boxes with respect to floor material depth and power and communication service configurations.

Another object of the invention is to provide a floor box which is made installer-friendly by the use of a structure which eliminates the need for pour covers and interior volume measurements.

A further object of the invention is to provide a floor box structure adapted to be readily ganged together with adjacent floor boxes to accommodate multiple activation sites at a single conduit juncture.

Another object of the invention is to provide a floor box comprising a series of internal supports at varying heights for receiving a bracket for mounting an activation kit over the interior volume of the floor box housing.

A further object of the invention is to provide a floor box structure which can be shipped in one piece and includes means for securing a plurality of reducer plugs to the exterior of the floor box housing during shipping thereof.

The above and other objects and advantages are provided by a floor box apparatus of the present invention comprising a closed housing adapted to be cut off substantially flush with and parallel to a floor surface. The floor box housing comprises a hollow interior defined by a base, a top, and at least one vertically extending side wall. A surface of the side wall includes gradient markings indicating the interior volume of the floor box.

The present floor box apparatus provides several advantages over present floor box designs. The gradient markings provide a quick and accurate measurement of interior floor box volume for inspection and building code compliance. In addition, the closed top serves a dual purpose: acting as a concrete cover during the pouring of the floor, and as a temporary debris cover after it is cut off but prior to activation of the floor box. Because of the closed floor box arrangement and the ability to attach reducer plugs to the outside of the floor box, there are fewer loose parts subject to loss or damage during shipping. The floor box of the present invention may also be economically fabricated as a two-piece plastic design, where both halves are identical and can be easily joined by ultrasonic welding or fusion bonding, for example.

BRIEF DESCRIPTION OF THE DRAWINGS

For a more complete understanding of this invention reference should now be had to the embodiment illustrated in greater detail in the accompanying drawings and described below by way of example of the invention.

In the drawings.

DETAILED DESCRIPTION OF THE PREFERRED EMBODIMENTS

In the following detailed description, where spatially orienting terms are used such as "left," "right," "vertical," "horizontal," and the like; it is to be understood that these terms are used for convenience of description of the preferred embodiments by reference to the drawings. These terms do not necessarily describe the absolute location in space, such as left, right, upward, downward, etc., that any part must assume.

Figure 1:
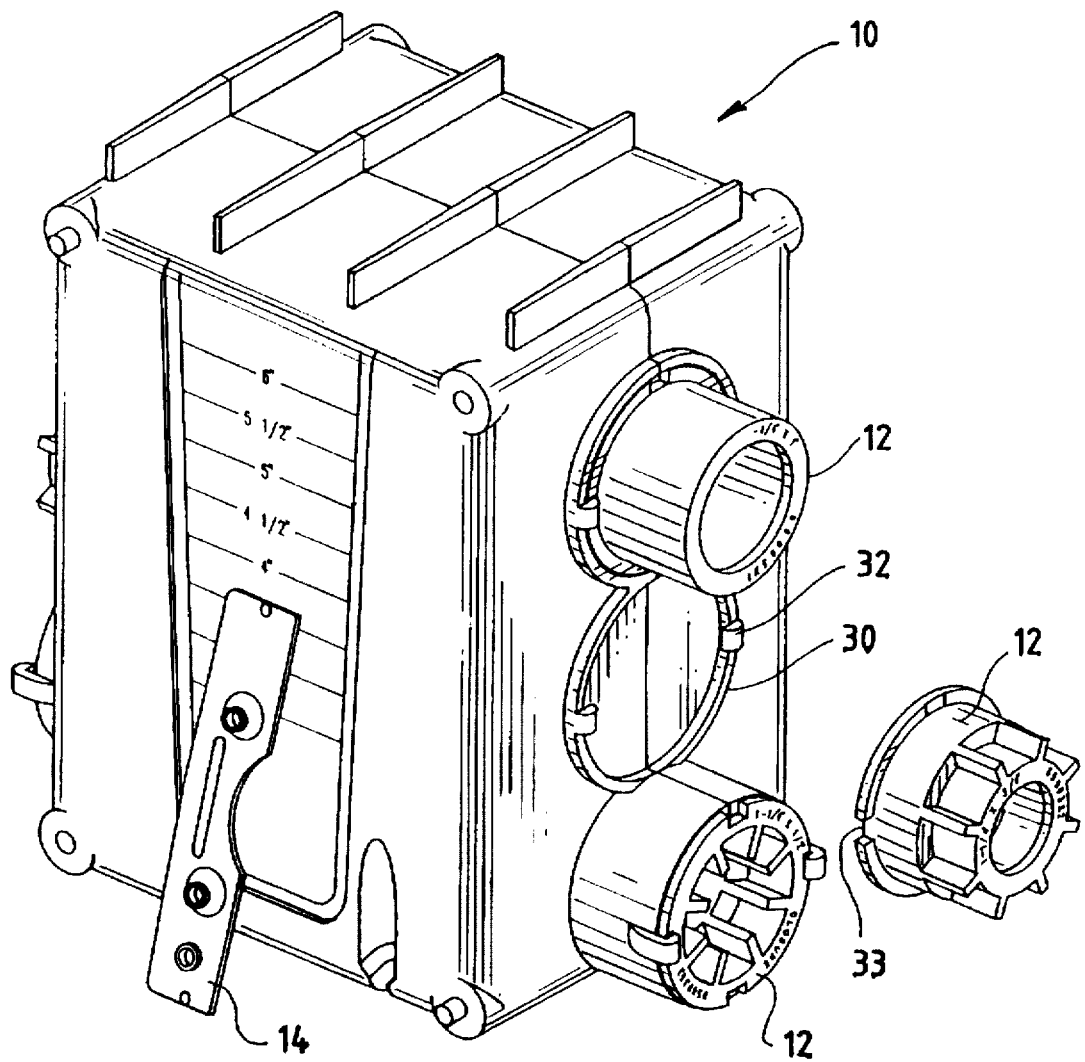
FIG. 1 is an isometric view of one embodiment of the floor box of the present invention.

Referring now to the drawings, FIG. 1 shows a closed floor box 10 of the present invention including installation hardware such as reducer plugs 12 and an activation kit bracket 14. The floor box 10 is referred to as a closed floor box because in its assembled state, there are no openings through which concrete or other debris can enter the housing. Unlike conventional floor boxes, there is no need for a separate cover or concrete mud cap to prevent debris or concrete from entering the housing.

Figure 2:
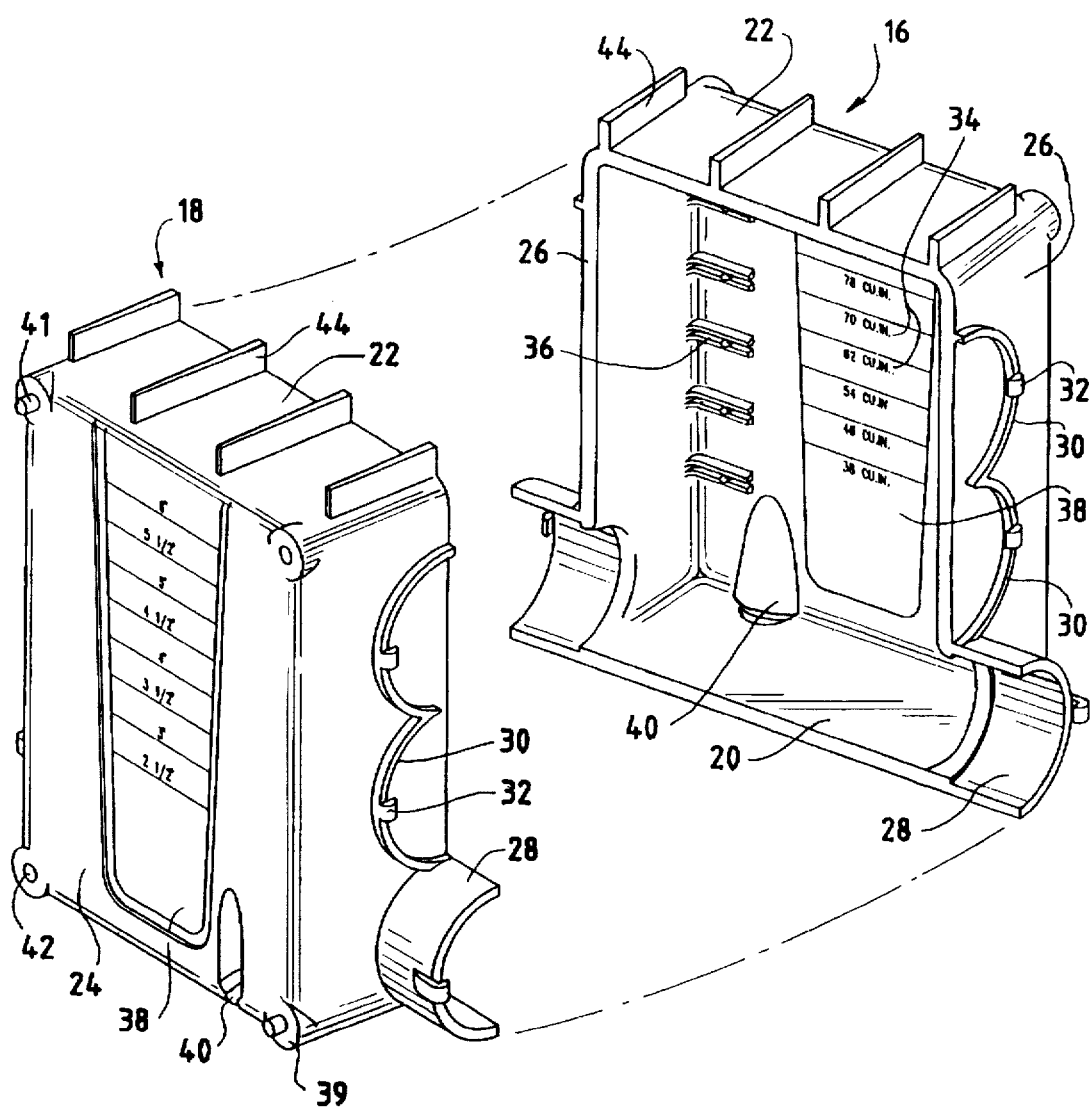
FIG. 2 is an isometric view illustrating the two-piece construction of the floor box of FIG. 1.

In one embodiment, the floor box 10 is formed by mating two pieces as shown in FIG. 2. The first piece 16 and the second piece 18 preferably are identical halves of the floor box constructed from molded plastic. The two pieces 16, 18 can be fusion bonded together to form a complete rigid floor box housing. Alternate means for joining the two pieces 16, 18 readily present themselves, such as ultrasonic welding, bolts, adhesives, or snap fittings. Advantages of the two-piece plastic construction include ease and economy of fabrication.

Figure 5:
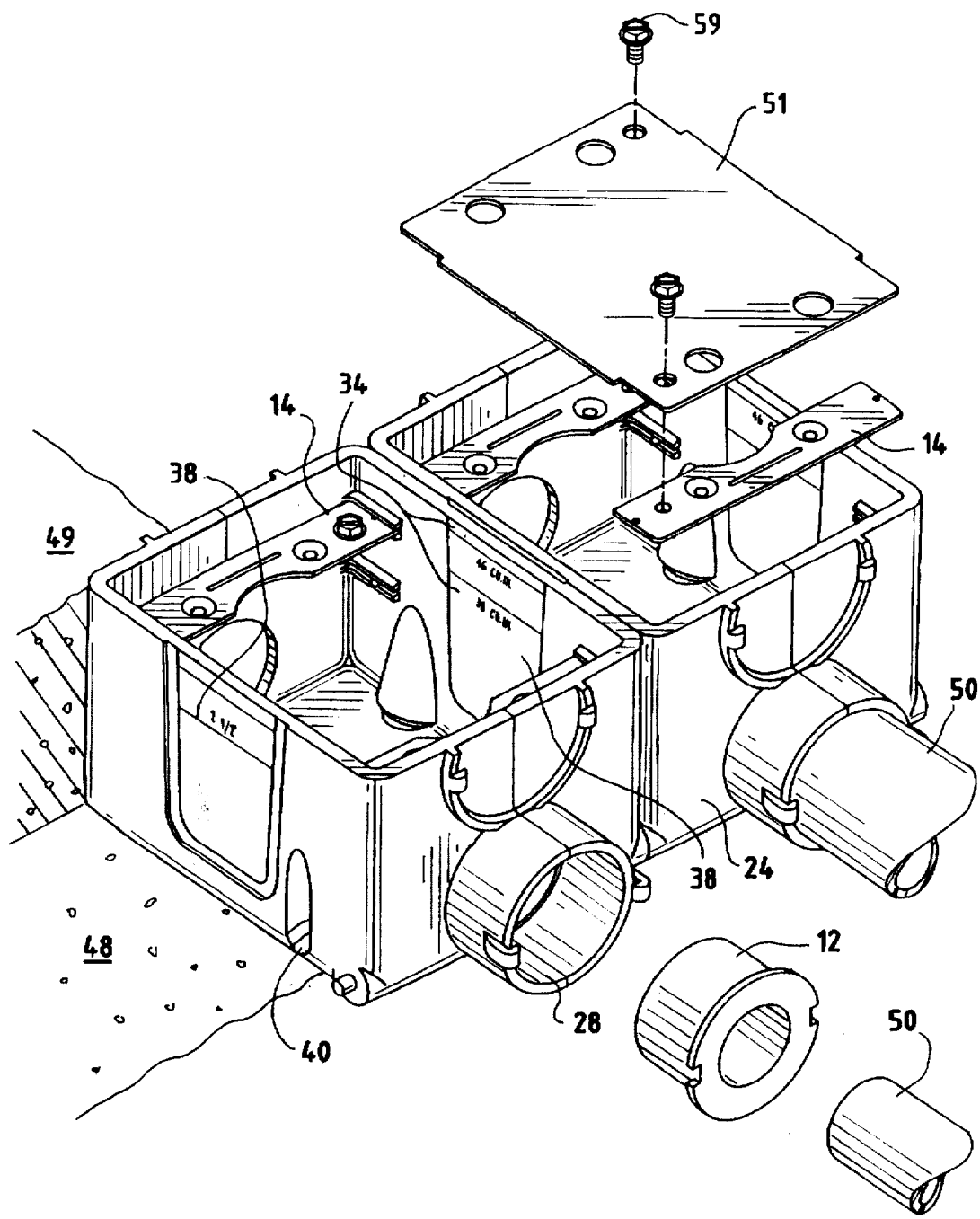
FIG. 5 is an isometric view of an installation of the floor box of FIG. 1 ganged to an adjacent floor box.
Figure 6:
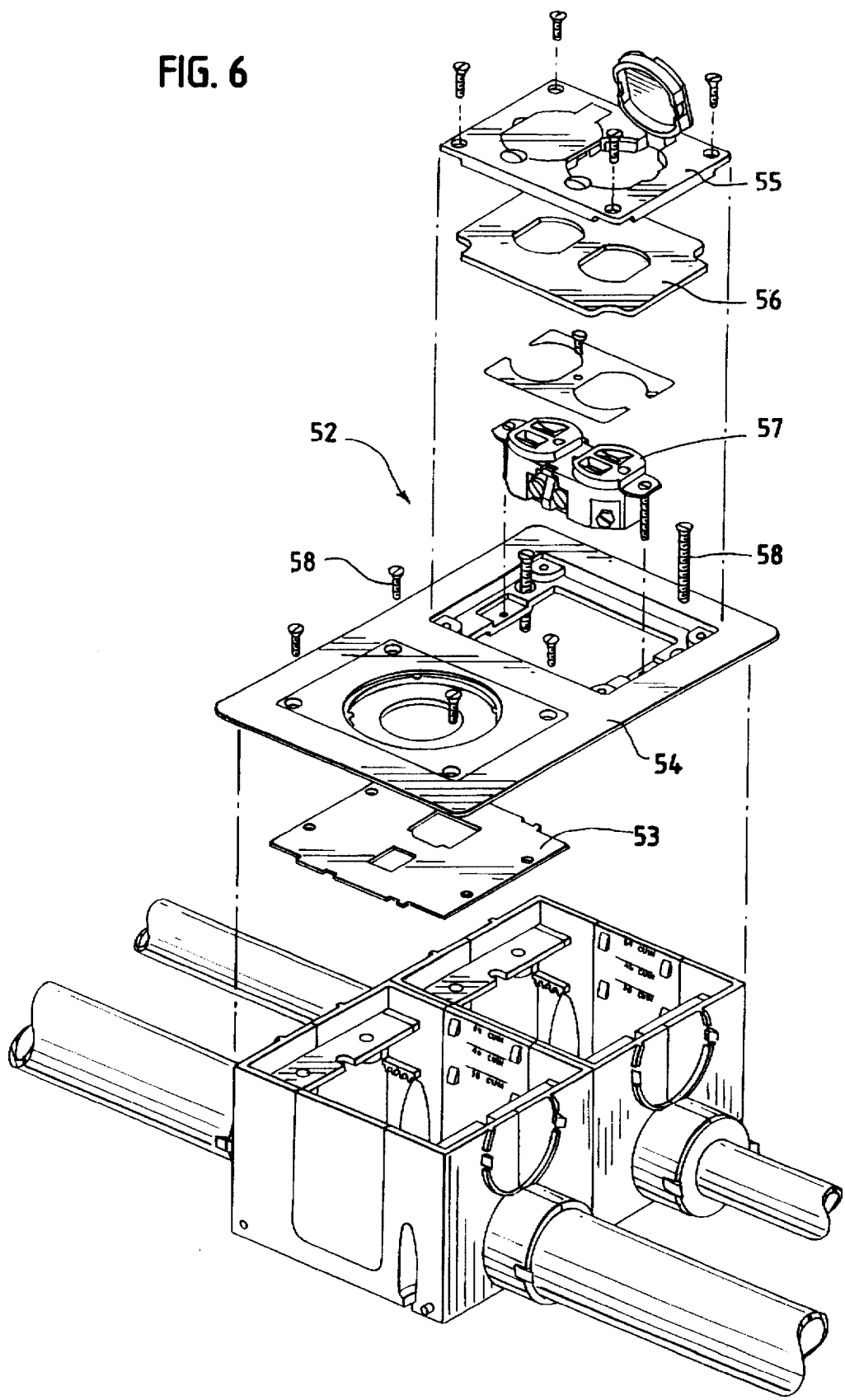
FIG. 6 is an isometric view of an installation of the floor box of FIG. 1 adapted for a multiple activation kit.

The first and second pieces 16, 18 of the floor box 10 each include a base 20, a top 22, vertically extending side walls 26, and a vertically extending end wall 24 extending between the opposing side walls 26. The exterior of the side wall 26 includes a semi-cylindrical flange 28. When the two pieces 16, 18 are mated together, the semi-cylindrical flange 28 of each piece join to form a cylinder for receiving a reducer plug 12, closure plug, or electrical conduit 50 as shown in FIGS. 5 and 6.

Figure 3:
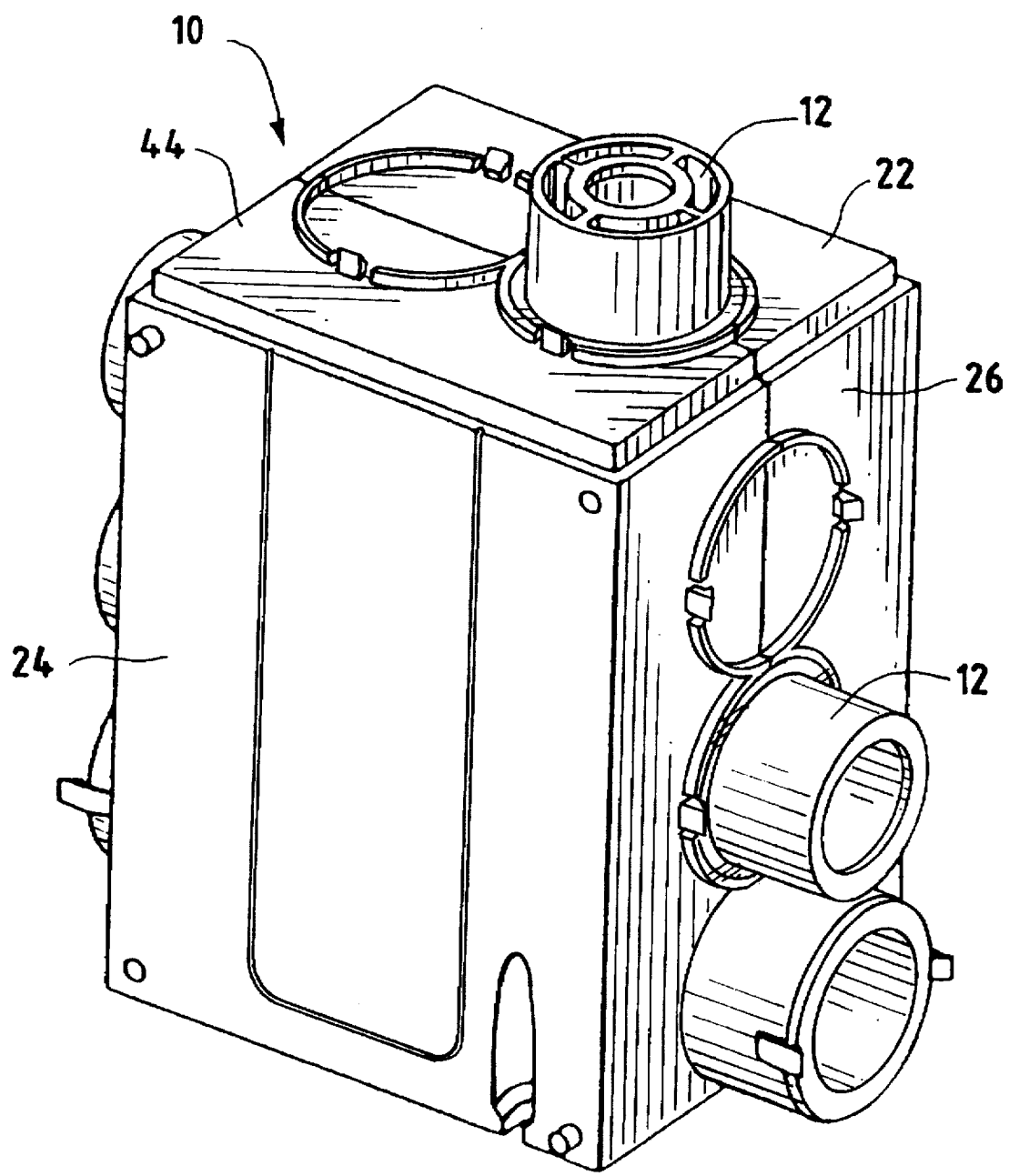
FIG. 3 is an isometric view of the floor box of FIG. 1, with one or more reducer plugs attached to the exterior of the housing.

As depicted in FIG. 2, the exterior of the side wall 26 also includes semi-circular raised ridges 30. Each ridge 30 further includes a tab 32 extending over the inside diameter of the circle created by the respective ridge 30 of each piece 16, 18 when the two pieces 16, 18 are mated together. As shown in FIG. 1, during storage and shipment of the floor box 10, the ridges 30 and tabs 32 of the side wall 26 secure the base of one or more reducer plugs 12 to avoid loose parts. A notch 33 around the perimeter of the base of the reducer plug 12 is reciprocally located with the tabs 32 to allow the reducer plugs 12 to be removably secured to the exterior of the floor box 10. FIG. 3 also shows that the top 22 may be adapted to secure reducer plugs 12 during shipping or storage.

Alternatively, tabs 32 may be constructed of sufficiently resilient material to obviate the need for notch 33. The reducer plugs 12 could be snapped into place and later released by bending tab 32 outward with, for example, the blade of a screwdriver.

Referring to FIG. 2, the end wall 24 includes interior gradient markings 34, supports 36, a breakout section 38, engaging means 39, and securing means 40.

The gradient markings 34 indicate the interior volume of the entire floor box 10 housing as measured from the base 20 to the respective marking 34. Similar markings can be located on the exterior of the floor box 10 to readily indicate the depth of concrete surrounding the floor box 10.

Supports 36 are vertically spaced along the interior of the end wall 24. The brackets 14 are adapted to attach to the supports 36 by slidably engaging a channel created by supports 36. Alternatively, the brackets 14 could form a channel to slidably engage the supports 36, or attach by any commonly known method.

The end wall 24 further includes a reduced thickness portion referred to as the breakout section 38. The reduced thickness of breakout section 38 allows it to be easily removed once the top 22 has been cut off of the floor box 10. Removing the breakout section 38 provides greater access to the interior of the floor box 10 when multiple floor boxes are ganged together as shown in FIGS. 5 and 6. Accordingly, more power or communication connections can be shared between ganged floor boxes with the breakout section 38 removed.

In order to gang multiple floor boxes together, end wall 24 further includes engaging means 39. The engaging means 39 include projections 41 and reciprocal sockets 42, although many other commonly known arrangements readily present themselves. For example, flanges adapted to receive bolts or adhesives, or snap fittings could be employed.

End wall 24 further includes securing means 40 for attaching the floor box 10 to a floor surface 48 as shown in FIG. 5. Securing means 40 provides an opening for receiving a fastener, such as a bolt, nail, screw, adhesive or the like.

Figure 4:
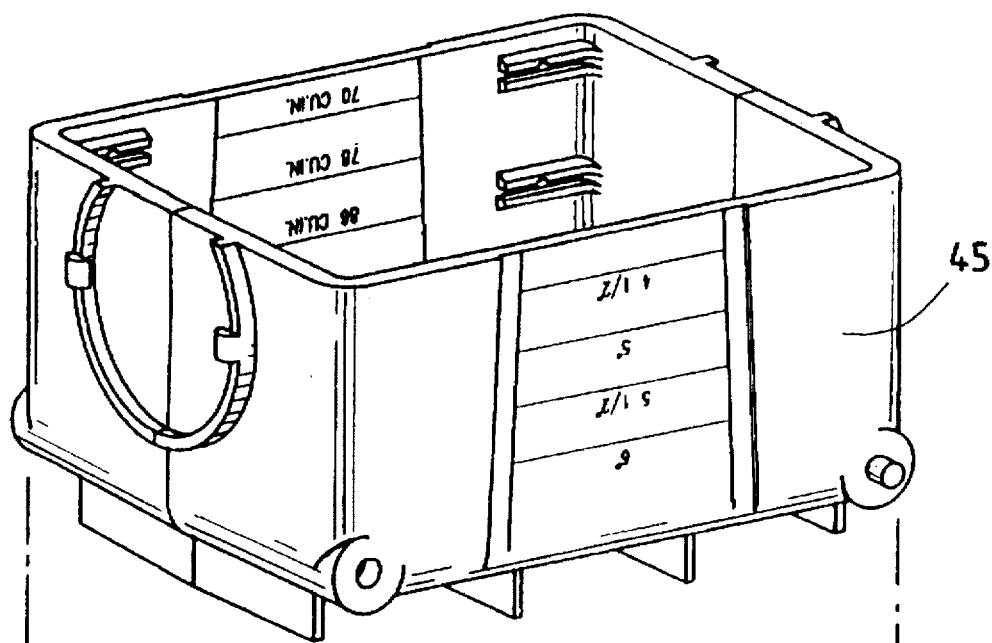
FIG. 4 is an isometric view of the floor box of FIG. 1 with the top portion of the housing cut off and inverted as a temporary cover.
Figure 4:
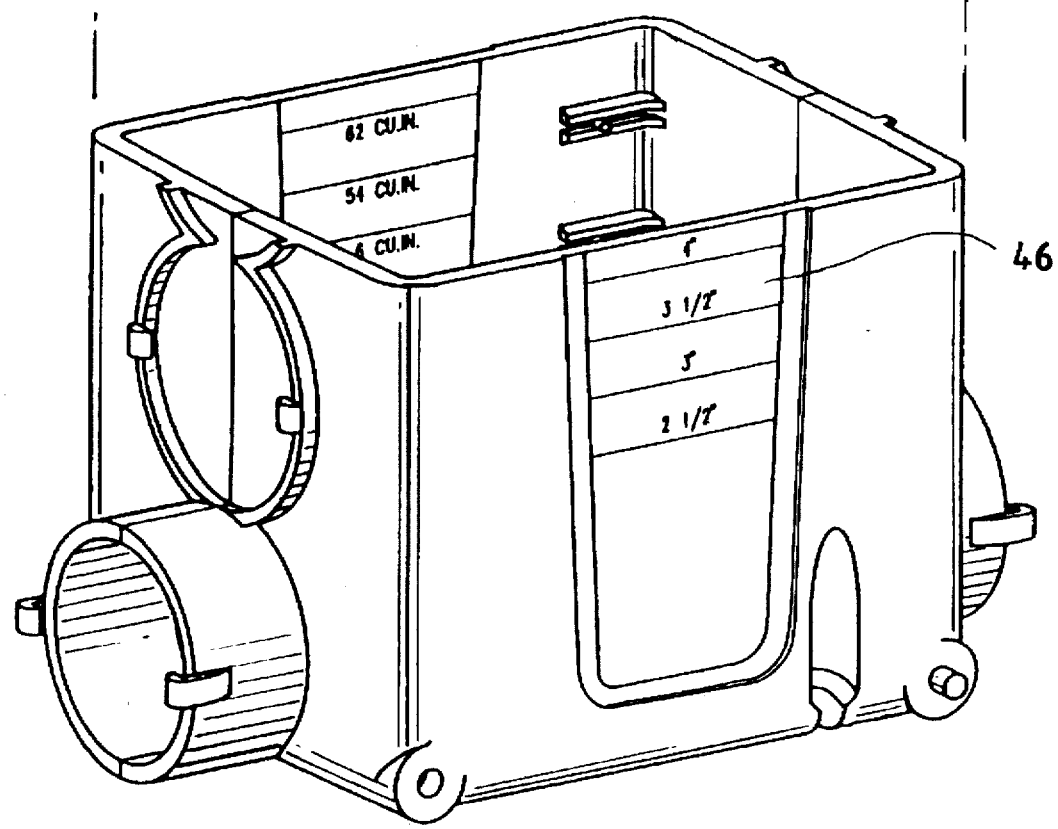

Referring to FIG. 2, the top 22 of the floor box 10 contains one or more extensions 44. Extensions 44 are located on the exterior of the top 22 of the floor box 10, and extend across a surface area less than the perimeter defined by the interior surface of the end wall 24 and side walls 26. Accordingly, as shown in FIG. 4, the cut off upper portion 45 of the floor box 10 can be inverted and placed over the lower portion 46, to act as a temporary cover. Lateral movement of the upper portion 45 is prevented by engaging extensions 44 with the interior surface of the side walls 26 and the end walls 24. The temporary cover is used after the concrete pour but prior to activation of the floor box 10. The cover provides easy access to the interior of the housing for wiring and connection services, yet keeps unwanted debris and material from entering the housing.

Alternatively, numerous other constructions could be devised for permitting the top 22 to serve as a temporary cover. For example, as shown in FIG. 3, the exterior of the top 22 could include a tapered projection having a reduced circumference with respect to the interior surface of the vertically extending side and end walls 24, 26.

The operation of the floor box 10 may be understood upon reference to FIG. 5 which shows two ganged floor boxes 10 fixed to a floor surface 48 by securing means 40. Appropriate connections may be made to the floor box 10 by fitting electrical conduits 50 into flange 28. If necessary, a reducer plug 12 can be used to reduce the inside diameter of flange 28 prior to fitting conduit 50.

Once the appropriate conduit connections are made, concrete 49 is poured to the desired depth. After the concrete pour the upper portion 45 of the floor box 10 is sawed off flush with or slightly above and parallel to the upper surface of the concrete 49. The type of floor covering and activation kit desired will determine the amount of housing to remain extending above the upper surface of the concrete 49.

After removal of the upper portion 45, the interior of the housing is exposed as shown in FIG. 5. Gradient markings 34 indicate the interior volume of the remaining housing. The breakout section 38 may be removed if desired to allow shared access to the interior of the housing of each adjacent floor box. At this point, brackets 14 can be secured to supports 36. An activation kit or connector plate 51 can, in turn, be fixed to the brackets 14 by fasteners or ground screws 59.

FIG. 6 is an isometric view of an installation of the floor box of the present invention adapted for a multiple activation kit 52. An activation kit 52 may include a data connector plate 53, a trim ring 54, an activation cover 55, an activation gasket 56 in combination with ground screws or fasteners 58 to secure a duplex outlet 57.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A non-metallic floor box for mounting in a concrete floor, the floor box comprising:

a closed housing having a base, a top and a vertically extending side wall defining an interior volume and preventing concrete from entering the interior volume during pouring and setting of the concrete floor, the housing being adapted to be cut off substantially flush with and parallel to a floor surface to provide access to the interior volume of the housing; and the side wall having an interior surface and an exterior surface, the gradient markings disposed on the interior surface of the sidewall and the markings indicating the interior volume of the housing measured from the base to a respective one of said markings.

2. The floor box of claim 1, further comprising means for releasably securing a plurality of reducer plugs to an exterior surface of the housing.

3. The floor box of claim 1, wherein the interior surface of the sidewall further comprises supports adapted to receive a mounting bracket, the mounting bracket being adapted to support an activation kit over the interior volume.

4. The floor box of claim 1, further comprising securing means for securing the floor box to a subfloor.

5. The floor box of claim 1, wherein the housing is generally rectangular and wherein the sidewall comprises a first pair of opposing side walls and a second pair of opposing end walls extending between the first pair of opposing side walls, each wall of the first and second pair of walls having an interior and exterior surface, the exterior surface of the side walls including a cylindrical flange adapted to receive an electrical conduit and provide access to the interior volume of the housing.

6. The floor box of claim 5, wherein the end walls include a breakout section being removable to provide access to the interior volume of the housing.

7. The floor box of claim 5, wherein the exterior surfaces of the end walls include engaging means for joining said floor box to an exterior surface of a second, adjacent floor box to form an integral unit.

8. The floor box of claim 7, wherein the second floor box includes an end wall, and wherein the engaging means comprise sockets formed in one of the end walls of the floor box and reciprocal projections formed in the end wall of the second floor box being adapted to lockingly engage the floor boxes to each other.

* * * * *